(12) United States Patent
Tavener

(10) Patent No.: US 9,982,720 B2
(45) Date of Patent: May 29, 2018

(54) ROTATING SHAFT COUPLING

(71) Applicant: JAGUAR LAND ROVER LIMITED, Warwickshire (GB)

(72) Inventor: Stuart Tavener, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 0 days. days.

(21) Appl. No.: 15/300,298

(22) PCT Filed: Mar. 26, 2015

(86) PCT No.: PCT/EP2015/056566
§ 371 (c)(1),
(2) Date: Sep. 29, 2016

(87) PCT Pub. No.: WO2015/150221
PCT Pub. Date: Oct. 8, 2015

(65) Prior Publication Data
US 2017/0211630 A1 Jul. 27, 2017

(30) Foreign Application Priority Data

Apr. 1, 2014 (GB) .................................. 1405829.1

(51) Int. Cl.
*F16D 1/108* (2006.01)
*F16D 1/08* (2006.01)
*F16D 1/10* (2006.01)

(52) U.S. Cl.
CPC ........... *F16D 1/0858* (2013.01); *F16D 1/108* (2013.01); *F16D 2001/103* (2013.01); *Y10T 403/7033* (2015.01)

(58) Field of Classification Search
CPC ........ F16D 1/0858; F16D 1/108; F16D 1/116; F16D 2001/103; Y10T 403/7033;
(Continued)

(56) References Cited

U.S. PATENT DOCUMENTS 6,780,114 B2 * 8/2004 Sahashi .................. B60B 27/00
464/146
2001/0016520 A1 8/2001 Sahashi et al.
(Continued)

FOREIGN PATENT DOCUMENTS

CN 201284795 Y 8/2009
CN 101626904 A 1/2010
(Continued)

OTHER PUBLICATIONS

Translation of WO 03/100278. Haecker, Uwe. Series of Shafts and Method for Manufacturing the Same. Dec. 4, 2003.*
(Continued)

*Primary Examiner* — Josh Skroupa
(74) *Attorney, Agent, or Firm* — Carlson, Gaskey & Olds

(57) ABSTRACT

A rotary shaft coupling (10) for the drive-line of a vehicle includes a female component (11) of a propeller shaft (41) and a male component (12) of a drive axial pinion (42). The components have mutually engageable splines (14, 15) and circular regions (23, 25, 24, 26) drawn into engagement by a clamp nut (16) of the male component; the circular regions are a sliding or an interference fit. The clamp nut (16) may also be used to draw the components (11, 12) apart.

15 Claims, 2 Drawing Sheets

(58) Field of Classification Search
CPC ......... Y10T 403/7026; Y10T 403/7028; Y10T 403/7031; Y10T 403/7032; Y10T 403/7035
USPC ......... 403/369.5, 359.5, 359.1–359.4, 359.6; 464/182
See application file for complete search history.

(56) References Cited

U.S. PATENT DOCUMENTS

| | | |
|---|---|---|
| 2004/0154838 A1 | 8/2004 | Gaul |
| 2013/0294825 A1 | 11/2013 | Loeffler et al. |

FOREIGN PATENT DOCUMENTS

| | | |
|---|---|---|
| CN | 103307124 A | 9/2013 |
| DE | 102009019435 A1 | 11/2009 |
| EP | 1424152 A1 | 6/2004 |
| EP | 2031262 A1 | 3/2009 |
| EP | 2407021 A1 | 1/2012 |
| FR | 2712049 A1 | 5/1995 |
| GB | 2641224 A | 12/2009 |
| JP | 2001241459 A | 9/2001 |
| WO | 03100278 A1 | 12/2003 |
| WO | 2008/148373 A1 | 12/2008 |

OTHER PUBLICATIONS

Translation of CN 103307124. Chen, Bing. High-speed rotor positioning link structure. Sep. 18, 2013.*
Combined Search and Examination Report under Sections 17 and 18(3) for Application No. GB1405829.1 dated Oct. 10, 2014.
International Search Report and Written Opinion of the International Searching Authority for International application No. PCT/EP2015/056566 dated Oct. 26, 2015.
Patent Office of the People's Republic of China, First Search Report, Patent Application No. 201580017746.6 dated Feb. 24, 2018.

* cited by examiner

ROTATING SHAFT COUPLING

TECHNICAL FIELD

This invention relates to a coupling for a rotating shaft, in particular a propeller shaft of a vehicle.

BACKGROUND TO THE INVENTION

A typical motor vehicle, such as a car, may have an internal combustion engine at a distance from a drive axle. A propeller shaft transmits torque from the engine to the axle, usually via a multi-speed transmission. In the most common arrangement the transmission is in unit with the engine, but the transmission may alternatively be in unit with the drive axle.

A propeller shaft is typically 1-2.5 m long, and may include one or more support bearings towards the centre thereof. Where a vehicle has several drive axles, a propeller shaft may be provided for each of them.

A propeller shaft should be rotationally balanced if intended to turn at speed, as is the case in a vehicle. Typically in a vehicle, a propeller shaft must be designed for rotation at engine speed without exhibiting significant out of balance forces. Imbalance may be noticeable to the vehicle driver and vehicle occupants, and may induce noise and vibration in the vehicle structure and driveline in addition to reducing the life of bearings associated therewith.

Although a propeller shaft may have satisfactory rotational balance, it is also necessary to ensure that the end couplings thereof allow co-axial connection with the input and output drive members. Run-out, as a result of non-axial connection can result in generation of significant out of balance forces.

One kind of conventional connection provides the propeller shaft with a flange mounting for connection to a corresponding flange of an input member (e.g. transmission output shaft) and/or an output member (e.g. input shaft of a drive axle). Simple flange connections provide for fixing axially and radially, but do not eliminate the possibility of run-out at the coupling, and hence imbalance.

An alternative is to use a male/female spline connection to transmit torque. This arrangement is generally of lesser radial size, and thus less susceptible of generating out of balance forces; however a means of fixing against relative axial movement is required. Additionally a small degree of radial clearance is necessary to facilitate assembly of the splined connection, so that the possibility of run-out at the coupling is not wholly eliminated.

In a refinement, a collet-type clamp arrangement may be provided to fix a splined connection axially whilst centralizing the propeller shaft with the neighbouring drive/driven member.

What is required is a positively fixed connection which has the capability to eliminate run-out whilst at the coupling ensuring ease of assembly and disassembly.

SUMMARY OF THE INVENTION

According to an aspect of the invention, there is provided a rotary shaft coupling comprising a male component insertable into a female component on an axis of rotation, the male and female components having a corresponding non-circular form so as to be adapted to transmit torque therebetween, the male component having a clamp nut rotatable thereon about said axis, the clamp nut being distal of the non-circular form of said male component, having an internal thread for engagement with an external thread of said female component, and being retained on said male component by a radial component of said coupling, wherein said male and female components include respective circular regions adapted for engagement without radial clearance, a circular region of said male component being adjacent the non-circular form thereof, and being engageable with the circular region of the female component by on-screwing of said clamp nut.

There may be provided a rotary shaft coupling comprising a male component insertable into a female component on an axis of rotation, the male and female components having a corresponding non-circular form so as to be adapted to transmit torque therebetween, the male component having a clamp nut rotatable thereon about said axis, the clamp nut being distal of the non-circular form of said male component, having an internal thread for engagement with an external thread of said female component, and being retained on said male component by a radial component of said coupling, wherein said male and female components include respective circular regions adapted for engagement without radial clearance. In an embodiment, a circular region of said male component may be adjacent the non-circular form thereof. In an embodiment a circular region of said male component may be adjacent the non-circular form thereof and be engageable with the circular region of the female component.

The male and female circular regions may be a sliding fit, although they are preferably an interference fit.

In this arrangement progressive on-screwing of the clamp nut ensures progressive engagement of the circular regions over a sufficient axial length, which may be in the range 3-8 mm for a diameter of the male component in the range 15-40 mm.

It will be understood that diameters of the male and female components may be machined by machine tool, and accordingly concentricity with respect to the rotational axis can be assured. An interference fit ensures freedom from run-out at the coupling, and permits the torque transmitting function of the coupling to be separated from the function of maintaining concentricity.

As a result the coupling of the invention has a reduced tendency to exhibit out of balance forces, and this results in lower noise from the drive-line and an improved bearing life. As applied to a vehicle drive-line, the coupling of the invention is less likely to exhibit effects which may be noticeable to the driver and passengers. A flange coupling is eliminated, and accordingly any risk of run-out associated therewith. The sliding or interference fit of the circular regions ensures that the clamp nut is not required to contribute to maintaining concentricity.

The radial component of the coupling is in one embodiment a circlip adapted to be resiliently retained with one of the male component and the female component or clamp nut, and is engaged with the other of the male component and the female component or clamp nut by resilient deformation. Any suitable kind of circlip may be used, for example having a round section, a rectangular section, or a rounded rectangular section.

Typically the circlip is retained in a respective recess of the male component and clamp nut, and these recesses may comprise circular grooves. The mouth of the clamp nut and/or the tip of the male component may be chamfered or radiused to encourage resilient deformation of the circlip on relative insertion movement.

The circular regions may be provided on one or other side of the non-circular form, or both. In an embodiment of the invention a single circular region is provided at the distal side of the non-circular form of the male component. The non-circular form is in one embodiment splines, and the axial extent of such splines may be substantially equal on the male and female components.

In another embodiment a circular region is provided on both sides of the non-circular form of the male component, and corresponding circular regions are provided in the female component.

The invention is typically applied to a propeller shaft of a vehicle at the connection to a drive axle.

According to an aspect of the invention there is provided a method of assembling the rotary shaft coupling described above and comprising inserting the male component in the female component to engage said non-circular forms, engaging a circular region of the male component with a circular region of a female component, and on-screwing said clamp nut to draw said circular regions into complete circumferential engagement.

It may be that there is provided a method of assembling the rotary shaft coupling described above and comprising inserting the male component in the female component to engage said non-circular forms, engaging a circular region of the male component with a circular region of a female component, and on-screwing said clamp nut to draw said circular regions into further engagement, interference fit engagement, sliding fit engagement or axially abutting engagement.

The method may comprise abutting circular interference regions of the male and female components, and on-screwing the clamp nut to draw the circular interference regions into circumferential engagement.

The method may further include disassembling the rotary shaft coupling by off-screwing said clamp nut to draw said circular regions out of circumferential engagement, and withdrawing the male component from the female component. The clamp nut may be off-screwed to draw respective circular interference regions apart.

Some aspects of the invention will be apparent from the claims appended hereto.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

One or more embodiments of the invention will now be described, by way of example only, with reference to the accompanying drawings, in which.

DESCRIPTION OF AN EMBODIMENT

Figure 1:
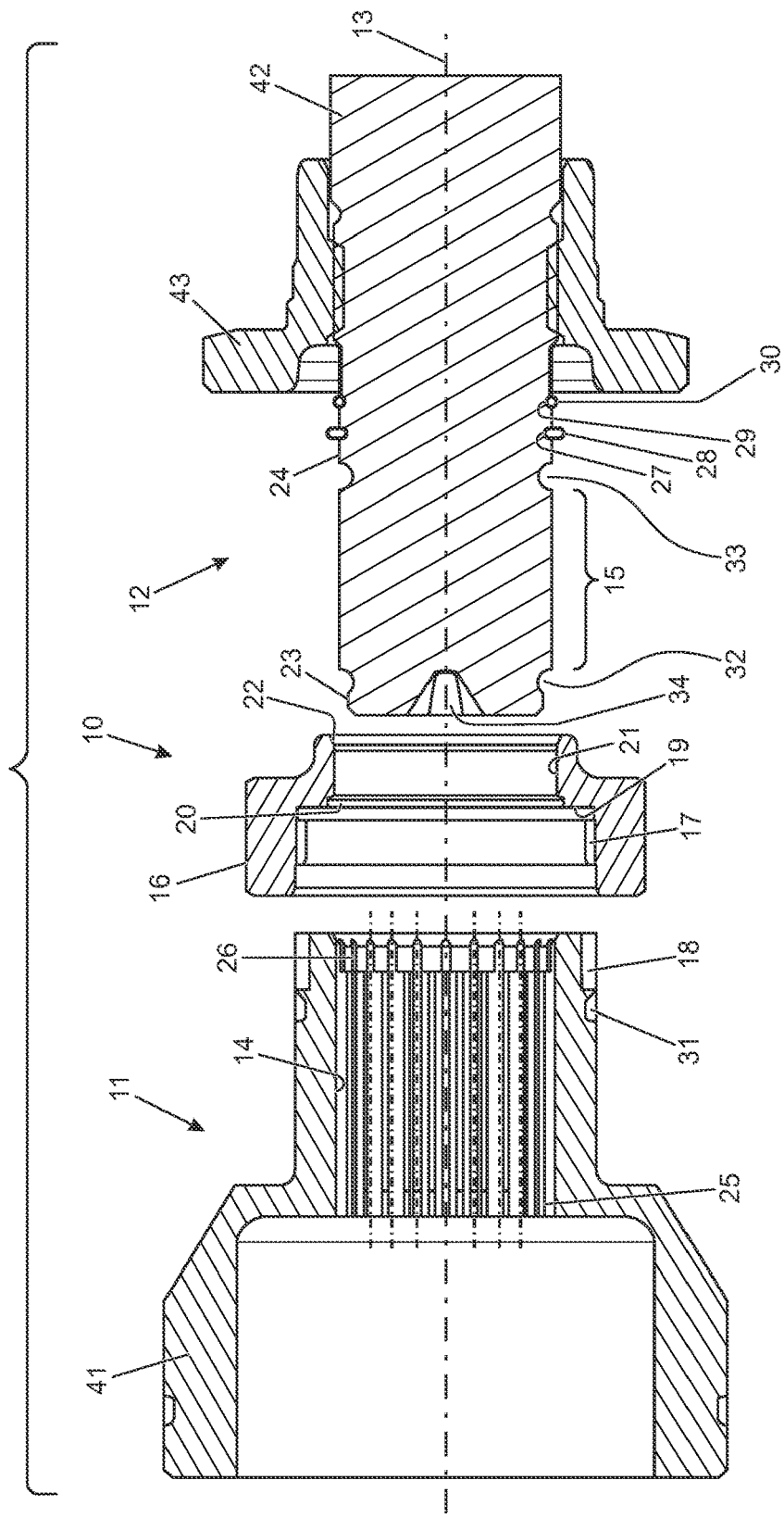
FIG. 1 is an exploded view of a joint assembly according to the invention.

With reference to the drawings, a rotary joint assembly 10 consists of a female component 11 and a male component 12, having a rotational axis 13. The female component 11 includes internal splines 14 for sliding engagement with external splines 15 of the male component 12, thereby to transmit torque about the axis 13.

An annular clamp nut 16 has an internal thread 17 for engagement with an external thread 18 on the exterior of the female component 11 adjacent the mouth of the splines 14. In the disassembled condition the clamp nut 16 is loose, as illustrated.

The through passage of the nut 16 is stepped to provide a shoulder 19 at the base of the internal thread 17, and the lesser diameter portion 21 is sized to receive the male component 12 with a small clearance. The mouth of the lesser diameter portion 21 has a chamfer 22 to ease insertion of the male component 12 in use.

Adjacent the shoulder 19, a circular recess 20 is provided to accommodate a locking ring or circlip, to be described below.

The male component 12 includes a nose 23 comprising a plain diameter less than the external diameter of the external splines 15, and a second plain diameter 24 at the inner (distal) end of the splines 15 which is equal to or greater than the external diameter thereof. On the female component corresponding internal diameters 25, 26 are provided at the axial ends of the internal splines 14. These co-operating portions 23, 25 and 24, 26 are an interference fit in use, as will be explained; in an alternative embodiment these co-operating portions could be a sliding fit.

Distal of the plain diameter 24, two circular grooves are provided on the external diameter of the male component 12. Closest to the external splines 15, a first groove 27 is sized and shaped to receive a circlip 28 of a known kind somewhat similar to a piston ring. The circlip 28 is a snap-fit in the first groove 27 and is sized to enter the circular recess 20 of the nut 16. The second groove 29 retains a resilient O ring 30 of conventional kind.

Also illustrated in FIG. 1 are conventional undercuts 31, 32, 33 to avoid a radiused edge at the adjacent radial face, and a conventional centre drilling 34 which is used during machining of the male component 12.

One method of connection of the joint assembly 10 is to initially screw the clamp nut 16 on to the female component 11 by one or two turns only. Then the male component 12 is pushed through the nut 16 into the female component 11 to engage the splines 14, 15.

The chamfer 22 engages the circlip 28, and reduces the diameter thereof to allow it to pass to the recess 20 as the male component 12 enters further into the female component. When the circlip 28 reaches the recess 20 it expands so that the nut is retained on the male component 12. The O ring 30 enters the corresponding bore of the clamp nut 16 to provide a seal against ingress of moisture and other contaminants, and to retain lubricant within the coupling.

Insertion of the male component 12 continues until the portions 23, 25 and 24, 26 are in substantial abutment but not axially engaged. At this stage the shoulder 19 of the clamp nut 16 should be at a slightly greater distance from the mouth of the female component 11 than the axial length of the plain portions 23, 24.

Figure 2:
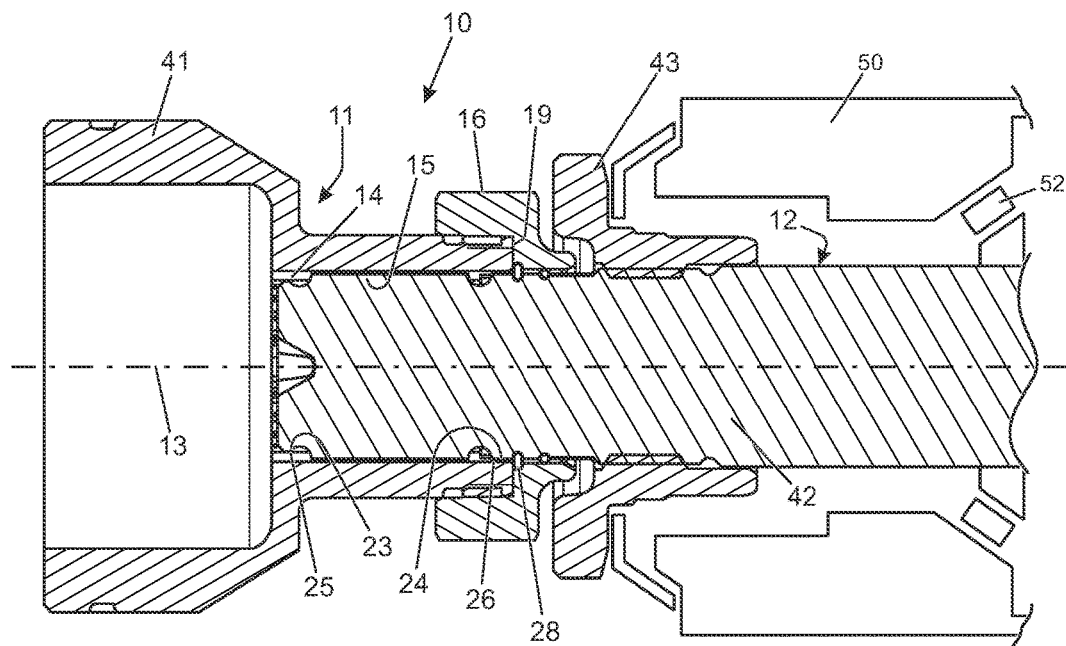
FIG. 2 illustrates the joint of FIG. 1 in an assembled condition.

Next the clamp nut 16 is screwed fully on to the female component 11, and in doing so the plain diameter portions 23, 24 are drawn into interference fit with the corresponding internal diameters 25, 26. This condition is illustrated in FIG. 2, in which the shoulder 19 engages the mouth of the female component 11. By virtue of the interference fit at 23, 25 and 24, 26, the male component 12 is assembled on a true centreline 13 without the possibility of radial play. Torque is transmissible from the male to female component, or vice versa, via the splines 14, 15.

It will be understood that the internal diameters 25, 26 may be continuous or discontinuous, depending on the manufacturing methods adapted for producing the splines 14; if discontinuous, the engaged length thereof is selected to ensure an appropriate interference fit. It will further be noted that the circlip 28, may be arranged to be under axial load against the mouth of the female component so as to obviate the possibility of relative axial movement after tightening the nut 16.

The embodiment illustrated in FIGS. 1 and 2 is suitable for use in a drive coupling of a propeller shaft of a vehicle, in particular for the connection between a propeller shaft and a drive axle. Although the male and female components may be arranged either way round, the illustrated arrangement comprises a propeller shaft 41 attached to or forming part of the female component 11, and a final drive pinion gear having a stub shaft 42 comprising the male component 12. FIGS. 1 and 2 further illustrate a pinion nut 43 surrounding the stub shaft 42 and screw-threaded thereto; this nut in use engages an axle housing and is used to pre-load a stub shaft bearing in a known manner. The pinion nut 43 forms no part of the present invention as such, save that it may be used in the following disassembly technique.

The example coupling includes a drive axle casing 50. The male component 12 is mounted in the casing 50 by a rolling element bearing 52. The pinion nut 43 is engageable in the axle casing 50 in use to load the bearing 52 axially.

As noted above the male component 12 and female component 11 are interengaged in an interference fit by on-screwing of the nut 16; the assembled condition is shown in FIG. 2, and the pinion nut 43 is illustrated in a tightened position in which a pre-load is applied to the right, as viewed. In this assembled condition the relative axial position of the stub shaft 42 and pinion nut 43 is fixed.

If the clamp nut 16 is now unscrewed (rightwards as viewed in FIG. 2), it will retreat from the female component 11 until in abutment with the pinion nut 43. Further unscrewing will result in the female component 11 being urged leftward as viewed since relative rightward movement of the clamp nut 16 is obstructed. By this means the female component 11 may be smoothly ejected from the male component 12 until the interference fit between portions 23, 25 and 24, 26 is released, thus permitting the propeller shaft to be released from the drive axle. The pinion nut 43 constitutes a radially extending shoulder of the male component 12.

For re-assembly, the male and female components 11, 12 are engaged whilst on-screwing the clamp nut 16, and the interference fit is obtained as previously described.

The kind of nut 16, 43 is not important, and may have an external hexagon or other conventional shape. Alternatively the nut could be adapted to a peg or C spanner.

Figure 3:
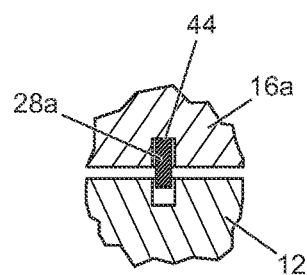
FIG. 3 is an enlarged partial section illustrating part of an alternative embodiment of the invention.

In the embodiment described above, the circular recess 20 is open. In an alternative a circlip groove 44 (FIG. 3) could be provided in a clamp nut 16a for snap-fitting engagement of a circlip 28a; in this embodiment the clamp nut is retained on the male component 12, and can be used to exert relative motion in both axial directions with respect to the female component 11. On-screwing is as previously described, but off-screwing does not require abutment with the pinion nut 43 (or other fixed abutment); off-screwing simply draws the male and female components apart by virtue of the groove 44. The circlip could also be retained in the clamp nut 16a and snap-fitted into a groove of the male component 12 upon axial engagement thereof.

The male/female spline connection is convenient for transmitting torque, but other arrangements are possible, including for example a parallel key or woodruff key.

The male and female components are produced by machining between centres, so that concentricity of the circular portions 23, 25, 24, 26 can be assured.

When the male component 12 and the female component 11 are engaged as shown in the embodiment described above circular portions providing interference fits are located at both the proximal end 23,25 and the distal end 24,26 of splines 14,15. Provision of interference fits at two axially-separated locations effectively centres and secures the male component relative to the female, thereby significantly reducing run out. Although a similarly effective connection may be formed having only one interference fit region, the overall length of interference fit that is required to adequately centre and secure the male part relative to the female part is reduced by providing two axially-separated regions, which causes a corresponding increase in the force required to assemble and disassemble the coupling. Accordingly, the tightness of the fit that can be provided at the two axially separated locations may be higher than could practically be achieved for a single relatively long interference region. Providing two axially separated interference fit regions therefore improves ease of assembly, reduces the packaging space required for the coupling, and further reduces run out.

Amendments and alternatives to the invention are envisaged within the scope of the appended claims.

Aspects of the invention will be apparent from the numbered clauses that follow.

1. A rotary shaft coupling comprising a male component insertable into a female component on an axis of rotation, the male and female components having a corresponding non-circular form so as to be adapted to transmit torque therebetween, the male component having a clamp nut rotatable thereon about said axis, the clamp nut being distal of the non-circular form of said male component, having an internal thread for engagement with an external thread of said female component, and being retained on said male component by a radial component of said coupling, wherein said male and female components include respective circular regions adapted for engagement without radial clearance, a circular region of said male component being adjacent the non-circular form thereof, and being engageable with the circular region of the female component by on-screwing of said clamp nut.

2. A coupling according to aspect 1 wherein said radial component comprises a circlip, and said clamp nut and male component have respective recesses for engagement with said circlip.

3. A coupling according to aspect 2 wherein the recess of said male component is a groove.

4. A coupling according to aspect 2 wherein the recess of said clamp nut is a groove.

5. A coupling according to aspect 2 wherein said circlip is radially expandable over said non-circular form of said male component.

6. A coupling according to aspect 2 wherein said circlip is radially compressible into said recess of said clamp nut.

7. A coupling according to aspect 1 wherein said non-circular form comprises splines.

8. A coupling according to aspect 1 wherein said circular regions are an interference fit.

9. A coupling according to aspect 8 and having a circular region at each end of the non-circular form of said male component.

10. A coupling according to aspect 9 and having a circular interference region at each end of the non-circular form of said female component.

11. A coupling according to aspect 8 wherein said male component has a circular interference region distal of the non-circular form thereof.

12. A coupling according to aspect 8 wherein said male component has said circular interference region at the proximal end of said splines, said region being substantially the root diameter of said splines.

13. A coupling according to aspect 8 wherein said male component has said circular interference region at the distal end of said splines, said region being substantially the outside diameter of said splines.

14. A coupling according to aspect 1 and a propeller shaft of a vehicle, the propeller shaft comprising a female component of aspect 1.

15. A coupling according to aspect 14 and a drive axle of a vehicle, an input shaft of a drive axle comprising a male component of aspect 1.

16. A coupling according to aspect 15 and further including a drive axle casing, said shank being mounted in said casing by a rolling element bearing, and said shank further including a pinion nut thereon distal of said clamp nut, said pinion nut being engageable in said casing in use to load said bearing axially.

17. A coupling according to aspect 16 wherein said clamp nut is adapted to engage said pinion nut upon unscrewing thereof from the fully engaged condition on said female component, thereby to disengage said circular interference regions, in use.

18. A method of assembling the rotary shaft coupling of aspect 1 and comprising:
  inserting the male component in the female component to engage said non-circular forms,
  engaging a circular region of the male component with a circular region of a female component, and
  on-screwing said clamp nut to draw said circular interference regions into complete circumferential engagement.

19. The method of aspect 18 comprising:
  abutting circular interference regions of the male and female components, and
  on-screwing said clamp nut to draw the circular interference regions into circumferential engagement.

20. The method of aspect 18 and further comprising disassembling the rotary shaft coupling by:
  off-screwing said clamp nut to draw said circular regions out of circumferential engagement, and withdrawing the male component from the female component.

The invention claimed is:

1. A rotary shaft coupling, comprising:
  a female component;
  a male component insertable into the female component on an axis of rotation, the male and female components having a corresponding non-circular form so as to be adapted to transmit torque therebetween, the male component having a clamp nut rotatable thereon about said axis, the clamp nut being distal of the non-circular form of said male component, the clamp nut having an internal thread for engagement with an external thread of said female component, the clamp nut being retained on said male component by a radial component of said rotary shaft coupling,
wherein said male and female components include respective circular regions at each end of the non-circular form adapted for engagement in an interference fit, one of the circular regions of said male component being adjacent the non-circular form of the male component, and the circular regions of the male component being engageable with the circular regions of the female component by on-screwing of said clamp nut and being able to disengage the circular regions by unscrewing said clamp nut.

2. A coupling according to claim 1, wherein said radial component comprises a circlip, and said clamp nut and male component have respective recesses for engagement with said circlip, wherein at least one of the recess of said male component and the recess of said clamp nut is a groove.

3. A coupling according to claim 2, wherein said circlip is at least one of radially expandable over said non-circular form of said male component and radially compressible into said recess of said clamp nut.

4. A coupling according to claim 1, including a circular interference region at each end of the non-circular form of said female component and wherein said non-circular form comprises splines.

5. A coupling according to claim 1, wherein said male component has one of said circular regions at a proximal end of said non-circular form, said one of said circular regions being substantially a root diameter of said non-circular form.

6. A coupling according to claim 1, wherein said male component has one of said circular regions at a distal end of said non-circular form, said one of said circular regions being substantially an outside diameter of said non-circular form.

7. A transmission assembly of a vehicle, and having a propeller shaft comprising the female component of claim 1 and an input shaft of a drive axle comprising the male component of claim 1.

8. The assembly of claim 7, wherein said input shaft comprises a shank of a drive axle input pinion.

9. The assembly of claim 8, including a drive axle casing, said shank being mounted in said casing by a rolling element bearing, and said shank including a pinion nut thereon distal of said clamp nut, said pinion nut being engageable in said casing in use to load said bearing axially.

10. The assembly of claim 9, wherein said clamp nut is adapted to engage said pinion nut upon unscrewing of said clamp nut from a fully engaged condition on said female component, thereby to disengage said circular regions, in use.

11. A motor vehicle having a drive-line including the assembly of claim 1.

12. A method of comprising assembling the rotary shaft coupling of claim 1 by:
  inserting the male component in the female component to engage said non-circular forms, engaging a circular region of the male component with a circular region of a female component, and
  on-screwing said clamp nut to draw said circular regions into complete circumferential engagement.

13. The method of claim 12, comprising:
  abutting the circular regions of the male and female components, and
  on-screwing said clamp nut to draw the circular regions into circumferential engagement.

14. The method of claim 12, comprising subsequently disassembling the assembled rotary shaft coupling by:
  off-screwing said clamp nut to draw said circular regions out of circumferential engagement, and withdrawing the male component from the female component.

15. The method of claim 14, wherein during the off-screwing said clamp nut is in abutment with a radially outwardly extending shoulder of said male component.

\* \* \* \* \*